June 24, 1958   G. K. HOOD, JR., ET AL   2,840,323
HINGED AIRFOIL WITH JET NOZZLE MEANS
FOR AIRCRAFT FLIGHT CONTROL
Filed May 17, 1956
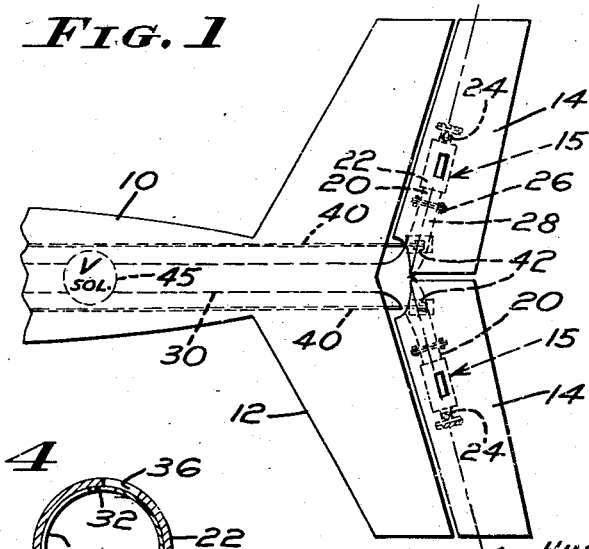
FIG. 1
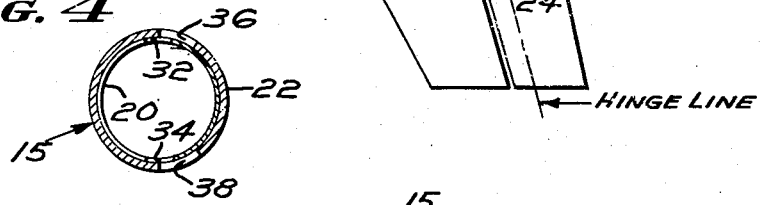
FIG. 4
FIG. 2
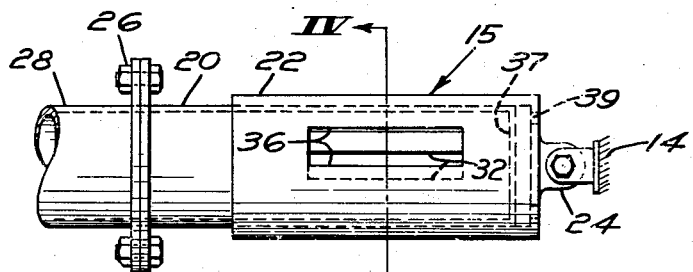
FIG. 3
INVENTORS:
GORDON K. HOOD, JR., and
JAMES A. O'MALLEY
BY:
Beau, Brooks, Buckley & Beau.
ATTORNEYS.

United States Patent Office

2,840,323
HINGED AIRFOIL WITH JET NOZZLE MEANS FOR AIRCRAFT FLIGHT CONTROL

Gordon K. Hood, Jr., Buffalo, and James A. O'Malley, Jr., North Tonawanda, N. Y., assignors to Bell Aircraft Corporation, Wheatfield, N. Y.

Application May 17, 1956, Serial No. 585,491

5 Claims. (Cl. 244—52)

This invention relates to aircraft, and more particularly to aircraft flight control means for aircraft operating at relatively high altitudes. Whereas, the W. W. Williams U. S. Patent No. 2,451,008, October 12, 1948, disclosed certain jet reaction control arrangements, subsequent experience and research has resulted in the present invention wherein important improvements and advantages are obtained as will be explained hereinafter.

It is one of the objects of the present invention to provide an improved aircraft flight control means comprising in novel combination, a movable aerodynamic control surface and a reaction jet nozzle so positioned and embodied in the structure of the aircraft as to provide an overall simplified aircraft structure and flight control system; featuring weight-saving structural simplifications, and optimum control performance.

Other objects and advantages of the invention will appear in the specification hereinafter.

In the accompanying drawings:

Fig. 1 is a fragmentary semi-schematic plan view of an airplane empennage structure, illustrating one exemplification of an embodiment of the invention;

Fig. 2 is a fragmentary side elevational view of the structure of Fig. 1;

Fig. 3 is an enlarged top plan view of a detail of Fig. 1; and

Fig. 4 is a section taken along line IV—IV of Fig. 3.

Whereas, in the accompanying drawing the invention is illustrated as being embodied by way of one typical application thereof in means for control of the aircraft attitude about the pitch axis thereof, it will be appreciated that the invention is also applicable with equal facility in generally similar manner to devices for controlling the aircraft attitude about the roll and yaw axes thereof.

Thus, for example, as shown in the accompanying drawing, the invention is illustrated in conjunction with an airplane including a fuselage tail portion 10 upon which is fixed a stationary "stabilizer" fin 12 to the trailing edge of which are hinged a pair of pitch control surfaces 14—14 of the type sometimes referred to as "elevators." Hence, pilot-controlled swinging of the elevators 14—14 upon their hinge connections will provide "pitch" control of the airplane attitude when the airplane is flying at or above "flying speed" and at relatively low altitudes where the atmosphere density is sufficient to provide the necessary aerodynamic reactions to pilot-controlled deflections of the surfaces 14—14 away from neutral positions. The arrangement of the present invention includes provision in conjunction with the movable surfaces of novel adjustable jet reaction nozzle devices as indicated generally at 15—15. As will be explained more fully hereinafter, the nozzles 15—15 are powered by suitable pressured gas supply means and are pilot-controlled automatically incidental to manipulation of the movable surface controls to produce variable discharge thrusts, either upwardly or downwardly as indicated at 16, 18 (Fig. 2) as dictated by the pilot control, to impart to the empennage portion of the airplane corresponding downward or upward "elevator" effects even when the airplane is flying at such high altitudes and in rare atmospheres or at such slow speed that the coincident movements of the elevators 14—14 are ineffectual for pitch control purposes.

It is a particular feature of the present invention that the jet nozzle devices 15—15 are designed also to function as the sole means for hingedly mounting the elevators 14—14 to the trailing edge of the stabilizer 12. For example, as shown in better detail in Figs. 3–4 each nozzle device 15 comprises a pair of relatively rotatable telescopically arranged cylinder devices such as an inner cylinder 20 and an outer cylinder 22 which are dimensioned so as to be relatively rotatable in the manner of a bearing device when in assembled condition. Each outer cylinder 22 is fixed to the corresponding movable surface 14, as by means of a clevis and bracket arrangement illustrated at 24 (Figs. 1 and 3); while each inner cylinder 20 is flange-bolted as indicated at 26 to extend rigidly as from a tubular branch duct 28 which extends from a main duct member 30 which is stationarily mounted in the aircraft fuselage by means of suitable brackets (not shown). Thus, the duct 30 and its branch portions 28—28 function to provide structural supports for the rotatable cylinder portions 22—22 which in turn carry the movable surfaces 14—14.

The duct 30 also conveys pressured gas from a source interiorly of the airplane fuselage to the interiors of the nozzle tubes 20—20. As shown in Fig. 4, the tubes 20—20 are each provided with a pair of generally diametrically opposed discharge slots 32—34 directed upwardly and downwardly, respectively; and the outer cylinders 22—22 are also each provided with outlet slots 36—38 directed generally upwardly and downwardly, respectively. The slots 36—38 are so positionally arranged relative to the slots 32—34 (Fig. 4) that relatively slight rotations of the outer cylinders 22—22 relative to the inner cylinders selectively controls discharge of pressured gas through the upper or lower slots 36—38. The inner cylinders 20 are closed at their inner ends as indicated at 37 (Fig. 3) and a gas bleed aperture is provided as indicated at 39 in the end wall of the outer cylinder 22 to vent any gas pressure leaking in between the cylinder walls.

The control surfaces 14—14 are arranged to be pilot-adjustable upon their hinge axes by any suitable means, such as by a conventional type push-pull member 40 (Fig. 2) and control horn 42. Thus, it will be appreciated that the airplane may be flown under normal low altitude flight conditions by conventional type pilot control of the movable surfaces 14—14; the control surfaces being thereupon swung relative to the stabilizer 12 upon the hinge axes defined by the nozzle devices 15—15. Similarly, under high altitude flight conditions or at "stall" speed when the deflections of the surfaces 14—14 will provide inadequate aerodynamic reactions, the pilot may nevertheless obtain adequate control through use of the same control mechanism, because pilot controlled deflections of the control surfaces 14—14 simultaneously produce nozzle opening adjustments of the devices 15—15 providing thrust reaction forces operable to control the attitude of the airplane consistent with the control command. A primary gas control valve as indicated at 45 (Figs. 1–2) may be provided in the line of the gas duct 30 to enable the pilot cut in or out the jet nozzle system as may be required; it being of course appreciated that the valve 45 may be remotely controlled from the pilot cockpit by any suitable mechanism (not shown).

Thus, it will be appreciated that the invention provides a structurally simplified, yet universally effective flight control means wherein the devices 15—15 function simultaneously as jet reaction nozzles and as hinge devices, and wherein actuation of the conventional aerodynamic surface control mechanism operates automatically to also cause the jet nozzles to be adjusted to provide jet nozzle reaction forces commensurate with the control command under conditions when the movable surface reaction forces are inadequate. As stated hereinabove, arrangements similar to the one illustrated and described hereinabove may be readily provided in conjunction with conventional type aileron and rudder systems of an airplane, so that jet reaction control effects will as described hereinabove be provided to supplement and take over when the conventional aerodynamic surface reaction effects are inadequate; in response to pilot manipulation of the same controls in the same manner throughout all low or high altitude flying maneuvers.

Also, it will of course be appreciated that although only one specific form of the invention has been illustrated and described herein, it will be apparent to those skilled in the art that the invention is not so limited but that various changes may be made therein without departing from the spirit of the invention or the scope of the appended claims.

We claim:

1. An airplane flight attitude control means comprising in combination, a positionally fixed airfoil, a positionally movable airfoil disposed generally in flight-alignment with said fixed airfoil, a hinge device interconnecting said fixed airfoil and said movable airfoil whereby to mount the latter in hinged relation to said fixed airfoil for angular adjustments for control of the airplane attitude about a flight maneuvering axis, said hinge device comprising a pair of telescopically related cylindrical members relatively rotatable about the longitudinal axis thereof, one of said cylindrical members being mounted upon said fixed airfoil, the other of said cylindrical members being mounted upon said movable airfoil whereby the latter is hingedly connected to said fixed airfoil, duct means conveying pressured gas into the innermost of said cylindrical members, and rotationally registrable ports formed through side wall portions of said inner and outer cylindrical members, said ports being positionally arranged so that upon swinging of said movable airfoil away from its aerodynamic neutral position behind said fixed airfoil said ports cooperate to release pressured gas in jet form interiorly of said hinge device into the ambient atmosphere to provide jet reaction forces against the airplane in the region of the hinge device tending to rotate the airplane about a flight control axis supplementing the aerodynamic reaction forces of the concurrently deflected movable airfoil away from its neutral position behind said fixed airfoil.

2. An airplane flight attitude control means comprising in combination, positionally fixed airplane structure, a positionally movable airfoil disposed adjacent said fixed structure, a hinge device interconnecting said fixed structure and said movable airfoil whereby to mount the latter in hinged relation to said fixed structure for angular adjustments thereof for control of the airplane attitude about a flight maneuvering axis, said hinge device comprising a pair of telescopically related cylindrical members relatively rotatable about the cylinder axis thereof, one of said cylindrical members being connected against rotation to said fixed structure, the other of said cylindrical members being connected against rotation to said movable airfoil, whereby the latter is hingedly connected to said fixed structure, duct means conveying pressured gas into the innermost of said cylindrical members, said cylindrical members having rotationally registrable ports formed through side wall portions thereof, said ports being so positionally related and dimensioned that upon swinging of said movable airfoil away from aerodynamic neutral position some of said ports move into registry whereby pressured gas from said duct discharges therefrom into the ambient atmosphere to provide jet reaction forces against the hinge device tending to rotate the airplane about a flight control axis supplementing the aerodynamic reaction forces resulting from concurrent deflection of said movable airfoil away from its aerodynamic neutral position.

3. An airplane flight attitude control means comprising in combination, a positionally fixed structure, a positionally movable aerodynamic reaction surface, a hinge device interconnecting said fixed structure and said movable surface whereby to mount the latter in hinged relation to said fixed structure for control of the airplane attitude about a flight maneuvering axis thereof, said hinge device including a cylindrical casing having a member relatively rotatable therein about the longitudinal axis thereof, said cylindrical casing being connected to extend from said surface, said member being connected to said fixed structure, duct means conveying pressured gas into the interior of said casing, upwardly and downwardly directed ports formed through the side wall portions of said cylindrical casing, said member being so positionally arranged and dimensioned that upon swinging of said movable surface away from aerodynamically neutral position said ports are differentially opened and closed whereby pressured gas from interiorly of said casing discharges therefrom into the ambient atmosphere to provide jet reaction forces against the hinge device tending to rotate the airplane about a flight control axis supplementing the aerodynamic reaction forces developed upon deflection of said movable surface away from its neutral position.

4. An airplane flight attitude control means comprising in combination, a positionally fixed airframe, a positionally movable airfoil, a hinge device interconnecting said fixed airframe and said movable airfoil whereby to mount the latter in hinged relation to said fixed airframe for control of the airplane attitude about a flight maneuvering axis thereof, said hinge device comprising a hollow bearing of two parts, one of said parts being connected to said fixed airframe, the other of said parts being connected to said movable airfoil whereby the latter is hingedly connected to said fixed airframe, duct means conveying pressured gas into the interior of said hollow bearing, said bearing having side wall ports so positionally arranged and dimensioned that upon swinging of said movable airfoil away from aerodynamically neutral position said ports are differentially controlled to provide pressured gas discharges therefrom into the ambient atmosphere to provide jet reaction forces tending to rotate the airplane about a flight control axis consistent with the control command on the movable airfoil.

5. An airplane flight attitude control means comprising in combination, airplane structure, a movable airfoil, a hinge device extending from said airfoil mounting the latter in hinged relation upon said airplane structure while permitting pilot adjustments thereof for control of airplane attitude about a flight maneuvering axis, said hinge device comprising relatively rotatable parts connected to said airplane structure and to said movable airfoil respectively, means conveying gas under pressure into the interior of said hinge device, said hinge device having side wall ports positionally arranged and dimensioned so that upon swinging of said movable airfoil away from aerodynamically neutral position said ports are differentially opened whereby pressured gas from interiorly of said hinge is discharged therefrom into the ambient atmosphere to provide jet reaction forces tending to rotate the airplane about said flight maneuvering axis.

References Cited in the file of this patent

UNITED STATES PATENTS 2,451,008    Williams _____ Oct. 12, 1948